(12) United States Patent
Kim et al.

(10) Patent No.: US 9,322,554 B2
(45) Date of Patent: Apr. 26, 2016

(54) TEMPERATURE MIXING ENHANCEMENT WITH LOCALLY CO-SWIRLING QUENCH JET PATTERN FOR GAS TURBINE ENGINE COMBUSTOR

(75) Inventors: Won-Wook Kim, West Hartford, CT (US); James B. Hoke, Tolland, CT (US); Timothy S. Snyder, Glastonbury, CT (US)

(73) Assignee: United Technologies Corporation, Hartford, CT (US)

( * ) Notice: Subject to any disclaimer, the term of this patent is extended or adjusted under 35 U.S.C. 154(b) by 968 days.

(21) Appl. No.: 13/194,182

(22) Filed: Jul. 29, 2011

(65) Prior Publication Data

US 2013/0025293 A1   Jan. 31, 2013

(51) Int. Cl.
*F02C 1/00* (2006.01)
*F23R 3/06* (2006.01)
*F23R 3/08* (2006.01)

(52) U.S. Cl.
CPC ... *F23R 3/06* (2013.01); *F23R 3/08* (2013.01); *Y02T 50/675* (2013.01)

(58) Field of Classification Search
CPC .. F23R 3/002; F23R 3/06; F23R 2900/03041; F23R 2900/03042; F23R 3/08
USPC .................................................. 60/752–760
See application file for complete search history.

(56) References Cited

U.S. PATENT DOCUMENTS

| | | | | |
|---|---|---|---|---|
| 2,821,066 A * | 1/1958 | Stanley et al. | | 60/748 |
| 3,645,095 A * | 2/1972 | Melconian | | 60/804 |
| 6,260,359 B1 | 7/2001 | Monty et al. | | |
| 6,606,861 B2 | 8/2003 | Snyder | | |
| 6,655,149 B2 * | 12/2003 | Farmer et al. | | 60/754 |
| 7,065,972 B2 | 6/2006 | Zupanc et al. | | |
| 7,628,020 B2 | 12/2009 | Alkabie et al. | | |
| 7,926,284 B2 | 4/2011 | Zupanc et al. | | |
| 8,584,466 B2 * | 11/2013 | Bronson et al. | | 60/752 |
| 2004/0006995 A1 * | 1/2004 | Snyder | | 60/796 |
| 2007/0193248 A1 * | 8/2007 | Bessagnet et al. | | 60/39.01 |
| 2008/0127651 A1 * | 6/2008 | Zupanc et al. | | 60/752 |
| 2009/0266080 A1 | 10/2009 | Pieussergues | | |
| 2009/0308077 A1 * | 12/2009 | Shelley et al. | | 60/752 |
| 2010/0287941 A1 * | 11/2010 | Kim et al. | | 60/752 |
| 2011/0120134 A1 * | 5/2011 | Hoke et al. | | 60/754 |

FOREIGN PATENT DOCUMENTS

EP    2133628    12/2009

OTHER PUBLICATIONS

European Search Report for EP Application No. 12177888.0 mailed Mar. 27, 2015.

* cited by examiner

*Primary Examiner* — Gerald L Sung
(74) *Attorney, Agent, or Firm* — Carlson, Gaskey & Olds, P.C.

(57) ABSTRACT

A combustor for a turbine engine includes a first liner defined about an axis with a first row of first combustion air holes, one of the first combustion air holes is defined along each of a multiple of fuel injector zero pitch lines. A second liner defined about the axis with a second row of second combustion air holes, each of the second combustion air holes circumferentially offset relative to each of the multiple of fuel injector zero pitch lines.

29 Claims, 5 Drawing Sheets

TEMPERATURE MIXING ENHANCEMENT WITH LOCALLY CO-SWIRLING QUENCH JET PATTERN FOR GAS TURBINE ENGINE COMBUSTOR

BACKGROUND

The present disclosure relates to a combustor for a gas turbine engine and, more particularly, to a hole pattern formed in inner and outer combustor liners.

Gas turbine engines, such as those which power modern commercial and military aircraft, include a compressor for pressurizing a supply of air, a combustor for burning a hydrocarbon fuel in the presence of the pressurized air, and a turbine for extracting energy from the resultant combustion gases. The combustor generally includes radially spaced apart inner and outer liners that define an annular combustion chamber therebetween. Arrays of circumferentially distributed combustion air holes penetrate multiple axial locations along each liner to radially admit the pressurized air into the combustion chamber. A plurality of circumferentially distributed fuel injectors axially project into a forward section of the combustion chamber to supply the fuel for mixing with the pressurized air.

Combustion of the hydrocarbon fuel in the presence of pressurized air may produce nitrogen oxide ($NO_X$) emissions that are subjected to excessively stringent controls by regulatory authorities, and thus are sought to be minimized as much as possible.

At least one known strategy for minimizing $NO_X$ emissions is referred to as rich burn, quick quench, lean burn (RQL) combustion. The RQL strategy recognizes that the conditions for $NO_X$ formation are most favorable at elevated combustion flame temperatures, such as when a fuel-air ratio is at or near stoichiometric, for example. A combustor configured for RQL combustion includes three serially arranged combustion zones: a rich burn zone at the forward end of the combustor, a quench or dilution zone axially aft of the rich burn zone, and a lean burn zone axially aft of the quench zone.

During engine operation, a portion of the pressurized air discharged from the compressor enters the rich burn zone of the combustion chamber. Concurrently, the fuel injectors introduce a stoichiometrically excessive quantity of fuel into the rich burn zone. Although the resulting stoichiometrically fuel rich fuel-air mixture is ignited and burned to partially release the energy content of the fuel, $NO_X$ formation may still occur.

The fuel rich combustion products then enter the quench zone where jets of pressurized air radially enter through combustion air holes from the compressor and into the quench zone of the combustion chamber. The pressurized air mixes with the combustion products to support further combustion of the fuel with air by progressively deriching the fuel rich combustion products as they flow axially through the quench zone and mix with the air. Initially, the fuel-air ratio of the combustion products changes from fuel rich to stoichiometric, causing an attendant rise in the combustion flame temperature. Since the quantity of $NO_X$ produced in a given time interval is known to increase exponentially with flame temperature, quantities of $NO_X$ may be produced during the initial quench process. As the quenching continues, the fuel-air ratio of the combustion products changes from stoichiometric to fuel lean, causing an attendant reduction in the flame temperature. However, until the mixture is diluted to a fuel-air ratio substantially lower than stoichiometric, the flame temperature remains high enough to generate considerable quantities of $NO_X$.

Finally, the deriched combustion products from the quench zone flow axially into the lean burn zone. Additional pressurized air in this zone supports ongoing combustion to release energy from the fuel. The additional pressurized air in this zone also regulates the peak temperature and spatial temperature profile of the combustion products to reduce turbine exposure to excessive temperatures and excessive temperature gradients.

SUMMARY

A combustor for a turbine engine according to an exemplary aspect of the present disclosure includes a first liner defined about an axis with a first row of first combustion air holes, one of the first combustion air holes is defined along each of a multiple of fuel injector zero pitch lines. A second liner defined about the axis with a second row of second combustion air holes. Each of the second combustion air holes are circumferentially offset relative to each of the multiple of fuel injector zero pitch lines.

A combustor for a turbine engine according to an exemplary aspect of the present disclosure includes an outer liner with a multiple of circumferentially distributed outer combustion air holes including a three hole set in a four hole repeating pattern. A major outer air hole of each pattern defined along each of a multiple of fuel injector zero pitch lines. An inner liner circumscribed by the outer liner, the inner liner with a multiple of circumferentially distributed inner combustion air holes including a two hole set in a two hole repeating pattern each circumferentially offset relative to each of the multiple of fuel injector zero pitch lines.

BRIEF DESCRIPTION OF THE DRAWINGS

Various features will become apparent to those skilled in the art from the following detailed description of the disclosed non-limiting embodiment. The drawings that accompany the detailed description can be briefly described as follows.

DETAILED DESCRIPTION

Figure 1:
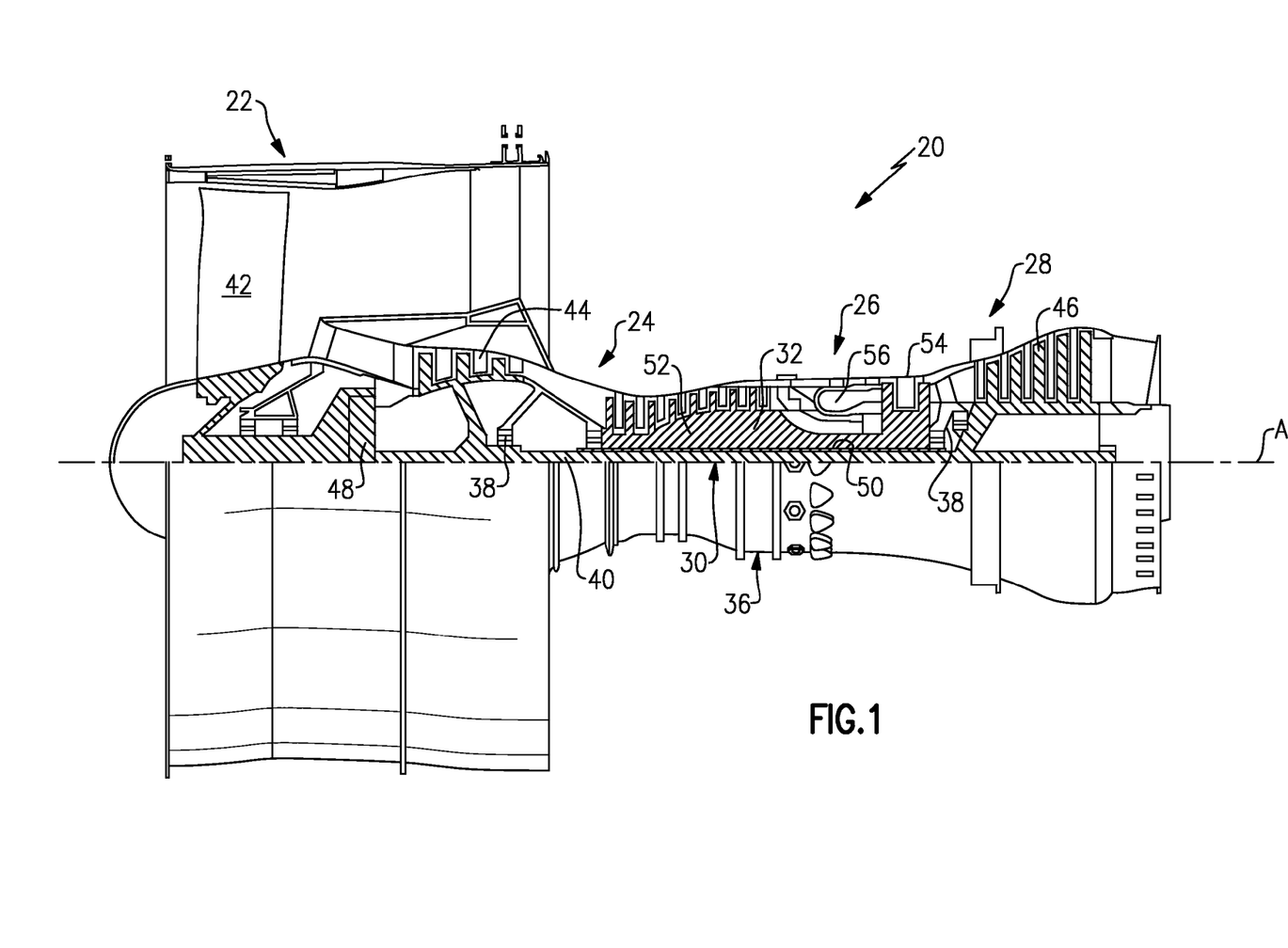
FIG. 1 is a schematic cross-section of a gas turbine engine.

FIG. 1 schematically illustrates a gas turbine engine 20. The gas turbine engine 20 is disclosed herein as a two-spool turbofan that generally incorporates a fan section 22, a compressor section 24, a combustor section 26 and a turbine section 28. Alternative engines might include an augmentor section (not shown) among other systems or features. The fan section 22 drives air along a bypass flowpath while the compressor section 24 drives air along a core flowpath for compression and communication into the combustor section 26 then expansion through the turbine section 28. Although depicted as a turbofan gas turbine engine in the disclosed non-limiting embodiment, it should be understood that the concepts described herein are not limited to use with turbofans as the teachings may be applied to other types of turbine engines.

The engine 20 generally includes a low speed spool 30 and a high speed spool 32 mounted for rotation about an engine central longitudinal axis A relative to an engine static structure 36 via several bearing systems 38. It should be understood that various bearing systems 38 at various locations may alternatively or additionally be provided.

The low speed spool 30 generally includes an inner shaft 40 that interconnects a fan 42, a low pressure compressor 44 and a low pressure turbine 46. The inner shaft 40 is connected to the fan 42 through a geared architecture 48 to drive the fan 42 at a lower speed than the low speed spool 30. The high speed spool 32 includes an outer shaft 50 that interconnects a high pressure compressor 52 and high pressure turbine 54. A combustor 56 is arranged between the high pressure compressor 52 and the high pressure turbine 54. The inner shaft 40 and the outer shaft 50 are concentric and rotate about the engine central longitudinal axis A which is collinear with their longitudinal axes.

The core airflow is compressed by the low pressure compressor 44 then the high pressure compressor 52, mixed and burned with fuel within the combustor 56, then expanded over the high pressure turbine 54 and low pressure turbine 46. The turbines 54, 46 rotationally drive the respective low speed spool 30 and high speed spool 32 in response to the expansion.

Figure 2:
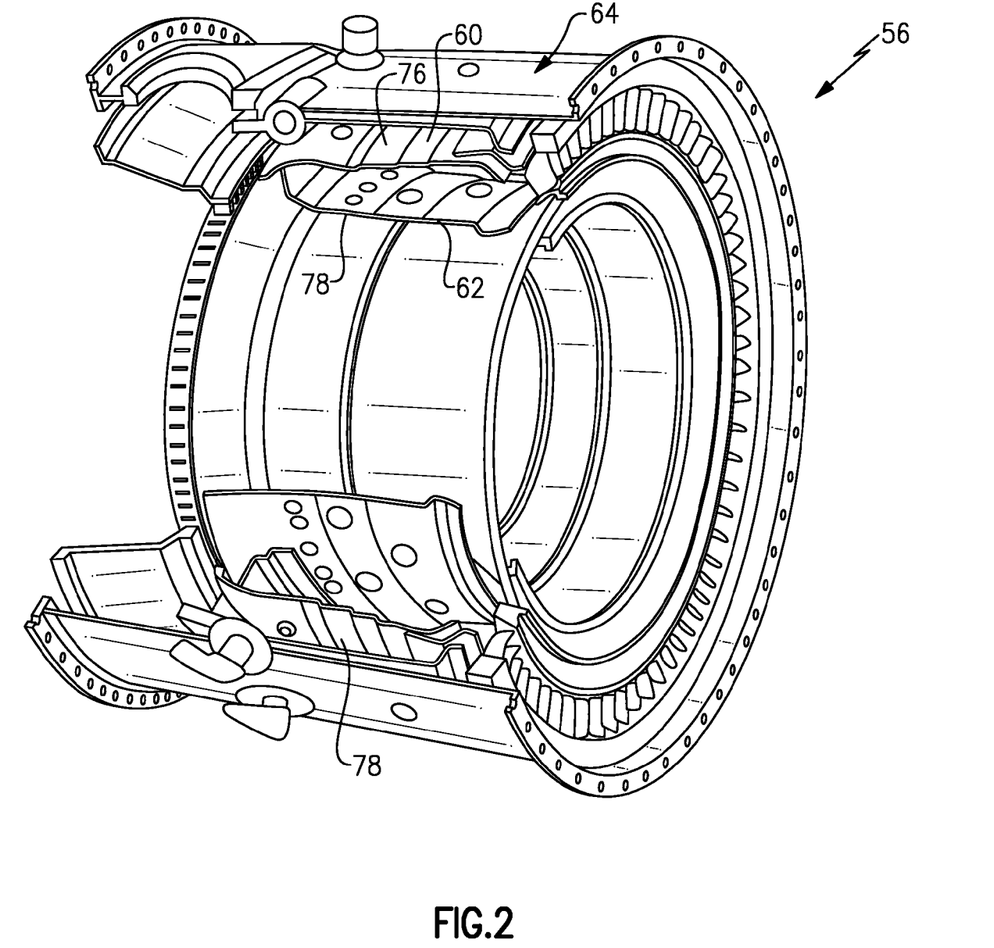
FIG. 2 is a perspective partial sectional view of an exemplary annular combustor that may be used with the gas turbine engine shown in FIG. 1.

With reference to FIG. 2, the combustor 56 generally includes an outer combustor liner 60 and an inner combustor liner 62. The outer combustor liner 60 and the inner combustor liner 62 are spaced inward from a combustor case 64 such that a combustion chamber 66 is defined there between. The combustion chamber 66 is generally annular in shape and is defined between combustor liners 60, 62.

The outer combustor liner 60 and the combustor case 64 define an outer annular plenum 76 and the inner combustor liner 62 and the combustor case 64 define an inner annular plenum 78. It should be understood that although a particular combustor is illustrated, other combustor types with various combustor liner panel arrangements will also benefit herefrom. It should be further understood that the disclosed cooling flow paths are but an illustrated embodiment and should not be limited only thereto.

Figure 3:
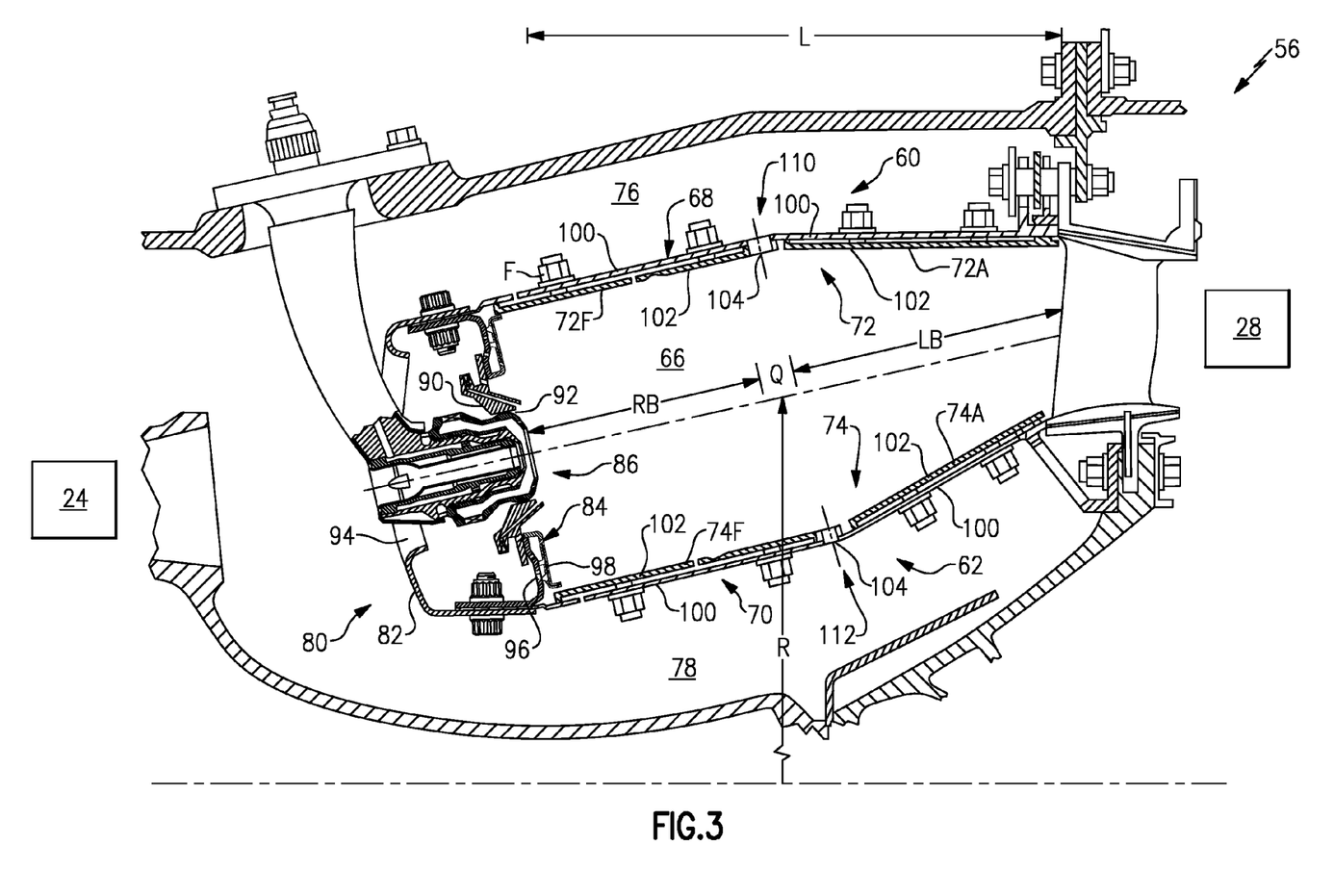
FIG. 3 is a cross-sectional view of an exemplary combustor that may be used with the gas turbine engine.

With reference to FIG. 3, the combustor liners 60, 62 contain the flame for direction toward the turbine section 28. Each combustor liner 60, 62 generally includes a support shell 68, 70 which supports one or more liner panels 72, 74 of the respective liners 60, 62, that are mounted to a hot side of the respective support shell 68, 70. The liner panels 72, 74 define a liner panel array which may be generally annular in shape. Each of the liner panels 72, 74 may be generally rectilinear and manufactured of, for example, a nickel based super alloy or ceramic material.

In the disclosed non-limiting embodiment, the liner panel array includes forward liner panels 72F and aft liner panels 72A that line the hot side of the outer shell 68 with forward liner panels 74F and aft liner panels 74A that line the hot side of the inner shell 70. Fastener assemblies F such as studs and nuts may be used to connect each of the liner panels 72, 74 to the respective inner and outer shells 68, 70 to provide a floatwall type array. It should be understood that various numbers, types, and array arrangements of liner panels may alternatively or additionally be provided.

The combustor 56 further includes a forward assembly 80 immediately downstream of the compressor section 24 to receive compressed airflow therefrom. The forward assembly 80 generally includes an annular hood 82, a bulkhead assembly 84, a multiple of fuel injectors 86 (one shown) and a multiple of fuel injector guides 90 that defines a central opening 92. The annular hood 82 extends radially between, and is secured to, the forwardmost ends of the liners 60, 62. The annular hood 82 includes a multiple of circumferentially distributed hood ports 94 that accommodate the respective fuel injector 86 and introduce air into the forward end of the combustion chamber 66. Each fuel injector 86 is secured to the outer case 64 and projects through one of the hood ports 94 and through the central opening 92 within the respective fuel injector guide 90.

Each of the fuel injector guide 90 is circumferentially aligned with one of the hood ports 94 to project through the bulkhead assembly 84. Each bulkhead assembly 84 also includes an annular bulkhead support shell 96 secured to the liners 60, 62 and a multiple of circumferentially distributed bulkhead heatshields segments 98 secured to the bulkhead support shell 96 around the central opening 92.

The forward assembly 80 introduces primary core combustion air into the forward end of the combustion chamber 66 while the remainder enters the outer annular plenum 76 and the inner annular plenum 78. The multiple of fuel injectors 86 and surrounding structure generate a swirling, intimately blended fuel-air mixture that supports combustion in the forward section of the combustion chamber 66.

Figure 4:
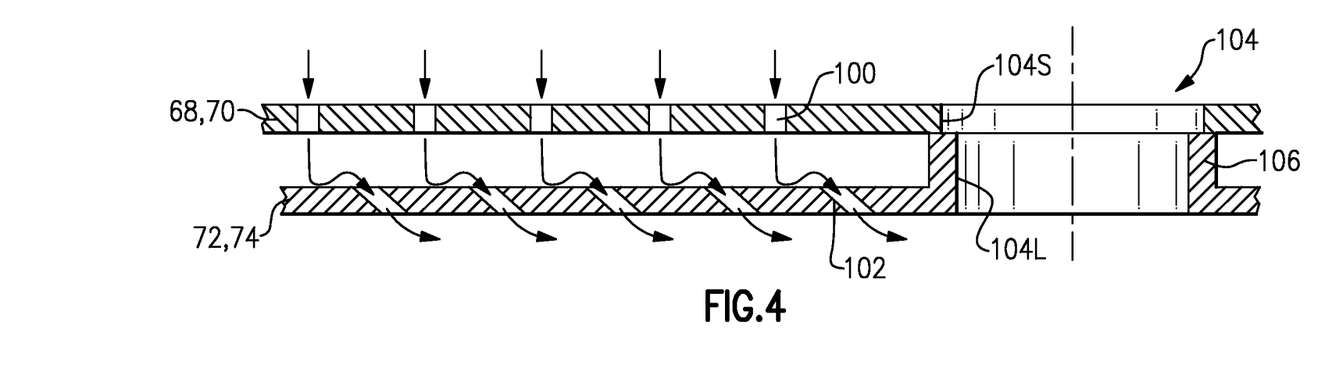
FIG. 4 is an expanded sectional view of a liner.

A plurality of axially and circumferentially distributed cooling air holes perforate the outer combustor liner 60 and the inner combustor liner 62. These cooling air holes include a plurality of impingement cooling air holes 100 which penetrate transversely through the support shell 68, 70, and a plurality of film cooling holes 102 which may penetrate obliquely (i.e. angled) through the liner panels 72, 74 (FIG. 4). The impingement cooling air holes 100 are readily distinguishable from combustion air holes 104 described hereinafter because the impingement cooling air holes 100, are generally far more numerous and substantially smaller than the combustion air holes 104, which facilitate combustion.

For example, the combustor 56 in one example has approximately 23,000 impingement holes, each about 0.64 millimeters (0.025 inches) in diameter, and a total of approximately 46,000 film cooling holes, each about 0.64 millimeters (0.025 inches) in diameter in the combustor 56 that includes thirty-six liner panels. Moreover, as described below, the cooling air discharged through the film cooling holes 102 hugs the liner panels 72, 74 to form a cooling film rather than penetrating into the interior of the combustion chamber 66 and participating in the combustion process. The combustion air holes 104 may also be described as quench jet holes; combustion holes; and dilution holes. In the disclosed non-limiting embodiment, the combustion air holes 104 form air jets which form counter-swirl combustion.

When in operation, pressurized cooling air from the plenums 76, 78 enters the impingement cooling air holes 100. The cooling air exits the impingement cooling air holes 100 as a series of discrete jets that impinge on and cool the liner panels 72, 74. The impinged cooling air then flows through the film cooling air holes 106, which discharge a series of cooling air jets into the combustion chamber 56. Because the film cooling air holes 102 are obliquely oriented, the film cooling air jets may enter the combustion chamber 66 with a directional component to essentially parallel the flame exposed surface of each liner panels 72, 74. The parallelism facilitates coalescence of the cooling air jets into a cooling film that hugs the flame exposed surfaces of the liner panels 72, 74. The illustrated film cooling holes 102 are oriented so that the cooling air discharged therefrom has both radial and axial directional components toward a downstream direction, however, the film cooling holes 102 may alternatively or additionally be oriented so that the discharged cooling air has a circumferential directional component as well.

Figure 5:
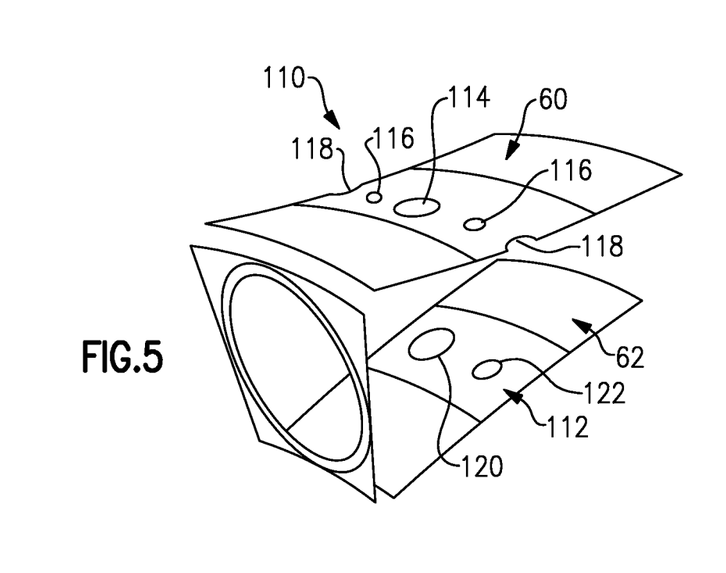
FIG. 5 is an expanded perspective view of a portion of the liner assembly.

Referring to FIG. 5 and with continued reference to FIG. 4, the outer combustor liner 60 and the inner combustor liner 62 each have a row 110, 112 of circumferentially distributed combustion air admission holes 104 which penetrate therethrough (FIG. 5). Each of the combustion air admission holes 104 are defined by a hole 104S in the support shell 68, 70 and a corresponding hole 104L in the respective liner panels 72, 74. A raised rim 106, integral with the liner panels 72, 74, circumscribes or defines each hole 104L to occupy the radial space between the support shell 68, 70 and the respective liner panels 72, 74 so that each hole 104 is in the form of a short, sealed passage which is operable to direct combustion air from the plenums 76, 78 to the combustion chamber 66 (FIG. 4).

In the disclosed non-limiting embodiment, each row 110, 112 penetrates its respective liner at about midway along an axial length L of the liner assembly, which corresponds to a location proximate the trailing edge of each forward liner panels 72F, 74F (see FIG. 3). The rows 110, 112 of holes in respective outer and inner liners 60, 62 generally denotes the division of the combustion chamber into three combustion zones, a rich burn zone RB axially forward of the holes, a dilution or quench zone Q axially coincident with the holes, and a lean burn zone LB axially aft of the holes.

With reference to FIG. 5, the outer row 110 of combustion air holes 104 in the outer combustor liner 60 includes a first set of holes 114, 116, 118 that are arranged in repeating order about a circumference of the outer combustor liner 60 to form a pattern. In one example, each pattern is aligned with one of the fuel injectors 86, thus, the number of patterns through the liners is commensurate with the number of fuel injectors 86.

The first set may include three combustion air holes that have hole sizes different from each other. For example, the outer combustor liner 60 includes a major outer air hole 114, a minor outer air hole 116 that is smaller than the major outer air hole 114 and an intermediate outer air hole 118 that is smaller than the major outer air hole 114 and larger than the minor outer air hole 116.

The inner row 112 of combustion air holes 104 in the inner combustor liner 62 in this example includes a second set of holes 120, 122 with major inner air hole 120 and minor inner air hole 122 that is smaller than the major inner air hole 120 but larger than the minor outer air hole 116. The second set of holes are arranged in a two hole pattern which is also commensurate with the number of fuel injectors 86.

Figure 6:
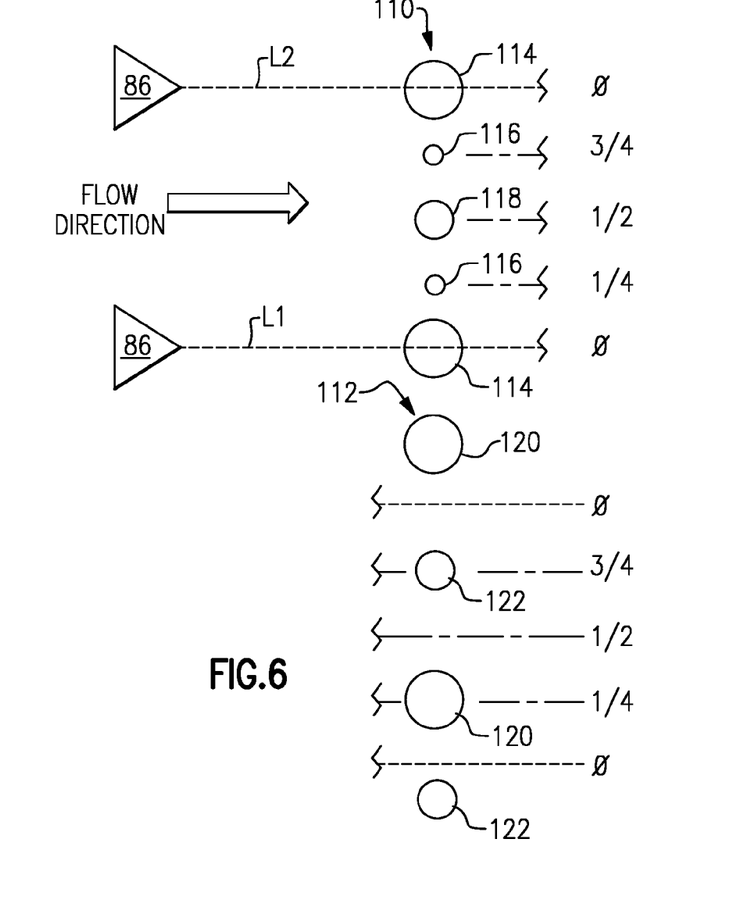
FIG. 6 is a plan view of an air hole arrangement within the liner panel.

With reference to FIG. 6, the outer row 110 of circumferentially distributed outer combustion air holes 104 includes the first hole set, with each first hole set arranged in the four air hole pattern. Each first hole set includes one major outer air hole 114 that is axially aligned with a fuel injector zero pitch line L along which one fuel injector 86 is located. That is, each fuel nozzle 86 is generally circumferentially aligned with the major outer air hole 114 of one of the four hole patterns, with the fuel nozzle 86 and the major outer air hole 114 located in the axial direction along the fuel injector zero pitch line L.

The major outer air hole 114 is circumferentially spaced from one minor outer air hole 116, which is circumferentially spaced from one intermediate outer air hole 118 that is circumferentially spaced from another minor outer air hole 116. The four hole pattern then repeats which again begins with one major outer air hole 114 located upon the next fuel injector zero pitch line L2 offset in a circumferential direction from the fuel injector zero pitch lines L1. Thus, the outer row 110 of circumferentially distributed outer combustion air holes 104 has the pattern of one major outer air hole 114 followed by one minor outer air hole 116, followed by one intermediate outer air hole 118 followed by another minor outer air hole 116, etc. With respect to the fuel injector zero pitch lines L1, the major outer air hole 114 is defined at 0 pitch; the minor outer air hole 116 is defined at ¼ pitch; the intermediate outer air hole 118 is defined at ½ pitch; and the second minor outer air hole 116 is defined at ¾ pitch. It should be understood that the terms 0 pitch, ¼ pitch. ½ pitch and ¾ pitch for the purposes of this disclosure refer to the relative circumferential offset of each combustion air holes 104 with respect to the zero pitch line L and within the same set of the combustion air holes 104.

The inner row 112 of circumferentially distributed inner combustion air holes includes the second air hole set, with each second hole set including the two air hole pattern. The two air hole pattern includes one major inner air hole 120 circumferentially spaced from one minor inner air hole 122. The major inner air hole 120 and the minor inner air hole 122 are axially aligned with each minor outer air hole 116 and are circumferentially spaced from the fuel injector zero pitch lines L1, L2 etc. With respect to the fuel injector zero pitch lines L1, the major inner air hole 120 is defined at ¼ pitch and the minor inner air hole 122 is defined at ¾ pitch.

Figure 7:
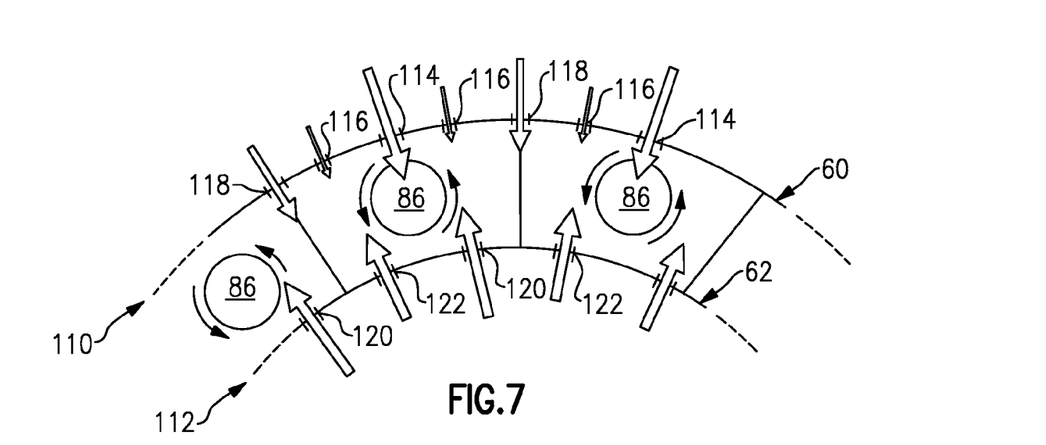
FIG. 7 is a sectional view of an air flow which increases the dilution and reinforcement of a swirl flow from each fuel injector.

With reference to FIG. 7, the air hole pattern makes use of unequal hole sizes on the outer combustor liner 60 to dilute the fuel rich swirler flow from each fuel injector 86. This is accomplished by the major outer air holes 114 that are in line with the fuel injector 86 so that the major outer air holes 114 flow 45-55% of the total jet flow from the outer combustor liner 60. The intermediate outer air holes 118 on the plane of symmetry between the fuel injectors 86 is approximately 35-45%. The minor outer air holes 116 provide a flow of approximately 5-15%. Thus the net effect is to locate more air in the circumferential region where the fuel rich swirl is located.

The air hole pattern of the inner row 112 of circumferentially distributed inner combustion air provides net swirl reinforcement by unequal sizing of the holes 120, 122 on the inner combustor liner 62. The major inner air holes 120 reinforce the swirl and provide approximately 55-65% of the air from the inner liner 62. The minor inner air holes 122 counters the swirl and receives 35-45% of the air in the inner liner jets. Thus the net effect is to reinforce the swirl.

With the best mode for carrying out the invention and the operation thereof having been described, certain additional features and benefits of the invention can now be more readily appreciated.

The axial location of the rows 110, 112 of air holes is selected to harmonize the competing considerations of optimizing the spatial temperature profile of the combustion products and preventing excessive NOx formation in the rich burn zone upstream of the holes. The rows are also positioned far enough aft to prevent the dilution air from being entrained into the fuel-air mixture immediately aft of the fuel injectors 86.

Evaluations using sophisticated computational fluid dynamics (CFD) techniques has shown the efficacy of the inventive combustor which provides effective cooling to address gas temperature variations inside the combustor chamber; enhance cooling through flow distribution with heat transfer enhancement features while maintaining increased film coverage and effectiveness throughout the combustor chamber; improve combustor durability by optimum distribution of cooling circuits; and facilitate lower emissions and improved turbine durability.

It should be understood that relative positional terms such as "forward," "aft," "upper," "lower," "above," "below," and the like are with reference to the normal operational attitude of the vehicle and should not be considered otherwise limiting.

It should be understood that like reference numerals identify corresponding or similar elements throughout the several drawings. It should also be understood that although a particular component arrangement is disclosed in the illustrated embodiment, other arrangements will benefit herefrom.

Although particular step sequences are shown, described, and claimed, it should be understood that steps may be performed in any order, separated or combined unless otherwise indicated and will still benefit from the present disclosure.

The foregoing description is exemplary rather than defined by the limitations within. Various non-limiting embodiments are disclosed herein, however, one of ordinary skill in the art would recognize that various modifications and variations in light of the above teachings will fall within the scope of the appended claims. It is therefore to be understood that within the scope of the appended claims, the disclosure may be practiced other than as specifically described. For that reason the appended claims should be studied to determine true scope and content.

What is claimed is:

1. A combustor for a turbine engine comprising:
a first liner defined about a liner axis with a first row of first combustion air holes circumferentially distributed about said liner axis, at least some of said first combustion air holes coaxially aligned with a corresponding fuel injector zero pitch line axis projecting from a centerline of a respective fuel injector of a plurality of fuel injectors;
a second liner defined about said liner axis with a second row of second combustion air holes circumferentially distributed about said liner axis, each of said second combustion air holes coaxially misaligned relative to each of said fuel injector zero pitch line axes; and
wherein said first row of first combustion air holes is a plurality of three hole sets in a four hole repeating pattern that includes a major air hole, a first minor air hole that is smaller than said major air hole and an intermediate air hole that is smaller than said major air hole and lamer than said first minor air hole.

2. The combustor as recited in claim 1, wherein a largest hole of each of said three hole sets, is defined along each of said fuel injector zero pitch line axes.

3. The combustor as recited in claim 1, wherein a first hole of said four hole repeating pattern is coaxially aligned with one of said fuel injector zero pitch line axes.

4. The combustor as recited in claim 1, wherein said four hole repeating pattern includes a second minor air hole that is smaller than said major air hole, said intermediate air hole is larger than said second minor air hole, and each of said first combustion air holes is configured to eject coolant into a combustion chamber bounded by said first liner.

5. The combustor as recited in claim 4, wherein said major air hole of each said pattern is defined at 0 pitch relative to each of said fuel injector zero pitch line axes.

6. The combustor as recited in claim 4, wherein said intermediate air hole of each said pattern is defined at ½ pitch relative to one of said fuel injector zero pitch line axes.

7. The combustor as recited in claim 4, wherein said first minor air hole of each said pattern is defined at ¼ pitch relative to one of said multiple of fuel injector zero pitch line axes and said second minor air hole of each pattern is defined at ¾ pitch relative to said one of said fuel injector zero pitch line axes.

8. The combustor as recited in claim 4, wherein said second row of second combustion air holes includes a two hole set in a two hole repeating pattern, said two hole set including a major inner hole and a minor inner hole that is smaller than said major inner hole but is larger than each of said first and second minor air holes.

9. The combustor as recited in claim 4, wherein said first liner includes a first liner panel mounted to a first support shell, said second liner includes a second liner panel mounted to a second support shell, said first row is formed in said first liner panel, and said second row is formed in said second liner panel.

10. The combustor as recited in claim 4, wherein each of said fuel injector zero pitch line axes is coaxially misaligned relative to each combustion air hole defined by said second liner at an axial position of said second row relative to said liner axis.

11. The combustor as recited in claim 4, wherein said first liner includes a first liner panel mounted to a first support shell, said second liner includes a second liner panel mounted to a second support shell, said first row is formed in said first liner panel, and said second row is formed in said second liner panel.

12. The combustor as recited in claim 11, wherein said second row of second combustion air holes includes a two hole set in a two hole repeating pattern, said two hole set including a major inner hole and a minor inner hole that is smaller than said major inner hole but is larger than each of said first and second minor air holes.

13. The combustor as recited in claim 1, wherein said second row of second combustion air holes is a plurality of two hole sets in a two hole repeating pattern.

14. A combustor for a turbine engine comprising:
an outer liner defining a liner axis with a multiple of circumferentially distributed outer combustion air holes including a plurality of three hole sets in a four hole repeating pattern, a multiple of fuel injector zero pitch line axes each projecting from a centerline of a respective fuel injector of a plurality of fuel injectors, each of said multiple of fuel injector zero pitch line axes being coaxially aligned with a corresponding major outer air hole of said four hole repeating pattern;
an inner liner circumscribed by said outer liner, said inner liner with a multiple of circumferentially distributed inner combustion air holes including a plurality of two hole sets in a two hole repeating pattern, each of said multiple of inner combustion air holes being circumferentially offset relative to each of said multiple of fuel injector zero pitch line axes; and
wherein each said four hole repeating pattern includes said major air hole, a first minor air hole that is smaller than said major air hole and an intermediate air hole that is smaller than said major air hole and larger than said first minor air hole.

15. The combustor as recited in claim 14, wherein:
each said our hole repeating pattern includes a second minor air hole that is smaller than said major air hole, and said intermediate air hole is larger than said second minor air hole; and
said major air hole, said first minor air hole, said second minor air hole, and said intermediate air hole are configured to eject coolant into a combustion chamber bounded by said outer liner.

16. The combustor as recited in claim 15, wherein said major air hole of each said four hole repeating pattern is defined at 0 pitch relative to one of said multiple of fuel injector zero pitch line axes.

17. The combustor as recited in claim 15, wherein said intermediate air hole of each said four hole repeating pattern is defined at ½ pitch relative to one of said multiple of fuel injector zero pitch line axes.

18. The combustor as recited in claim 15, wherein said first minor air hole of each said four hole repeating pattern is defined at ¼ pitch relative to one of said multiple of fuel injector zero pitch line axes, and said second minor air hole of each said pattern is defined at ¾ pitch relative to said one of said multiple of fuel injector zero pitch line axes.

19. The combustor as recited in claim 18, wherein said multiple of circumferentially distributed inner combustion air holes are each coaxially aligned with one of said first minor air hole and said second minor air hole.

20. The combustor as recited in claim 18, wherein each of said multiple of fuel injector zero pitch line axes is coaxially misaligned relative to each combustion air hole defined by said second liner at an axial position of said plurality of two hole sets relative to said liner axis.

21. The combustor as recited in claim 14, wherein said inner combustion air holes includes a two hole set in a two hole repeating pattern circumferentially distributed about said liner axis.

22. The combustor as recited in claim 21, wherein said two hole set includes a major inner hole and a minor inner hole smaller than said major inner hole, said major inner hole being configured to promote rotation of a fuel-air mixture about one of said multiple of fuel injector zero pitch line axes, and said minor inner hole being configured to oppose rotation of the fuel-air mixture.

23. The combustor as recited in claim 14, wherein said multiple of circumferentially distributed inner combustion air holes are each axially aligned with a minor outer air hole of said multiple of circumferentially distributed outer combustion air holes.

24. A combustor for a turbine engine comprising:
a first liner defined about a liner axis and including a first liner panel mounted to a first support shell, said first liner panel having a first row of first combustion air holes circumferentially distributed about a liner axis in a plurality of first sets, each of said first sets defining a four hole repeating pattern, and one of said first combustion air holes of each of said first sets being coaxially aligned with a fuel injector zero pitch line axis projecting from a centerline of a respective fuel injector of a plurality of fuel injectors;
a second liner including a second liner panel mounted to a second support shell, said second liner panel having a second row of second combustion air holes circumferentially distributed about said liner axis in a plurality of second sets, each of said second sets defining a two hole repeating pattern, and each of said second combustion air holes being coaxially misaligned relative to each said fuel injector zero pitch line axis; and
wherein each of said plurality of first sets includes a major air hole, a first minor air hole that is smaller than said major air hole, and an intermediate air hole that is smaller than said major air hole and larger than said first minor air hole.

25. The combustor as recited in claim 24, wherein each of said plurality of first sets includes a second minor air hole that is smaller than said major air hole, said intermediate air hole is larger than said second minor air hole, and wherein each of said second sets includes a major inner hole and a minor inner hole that is smaller than said major inner hole but is larger than each of said first and second minor outer holes.

26. The combustor as recited in claim 25, wherein each of said first and second minor air holes and said intermediate air hole is offset from each said fuel injector zero pitch line axis.

27. The combustor as recited in claim 26, wherein said major inner hole is configured to promote rotation of a fuel-air mixture about said fuel injector zero pitch line axis, and said minor inner hole is configured to oppose rotation of the fuel-air mixture.

28. The combustor as recited in claim 24, wherein each said fuel injector zero pitch line axis is coaxially misaligned relative to each combustion air hole defined by said second liner panel at an axial position of said second row relative to said liner axis.

29. The combustor as recited in claim 28, wherein a first quantity of said plurality of first sets distributed circumferentially about the axis is equal to a second quantity of said fuel injector zero pitch line axes.

\* \* \* \* \*